Oct. 29, 1929.  L. SYKES ET AL  1,733,247
PROCESS OF MANUFACTURE OF HORNS
Filed July 2, 1928
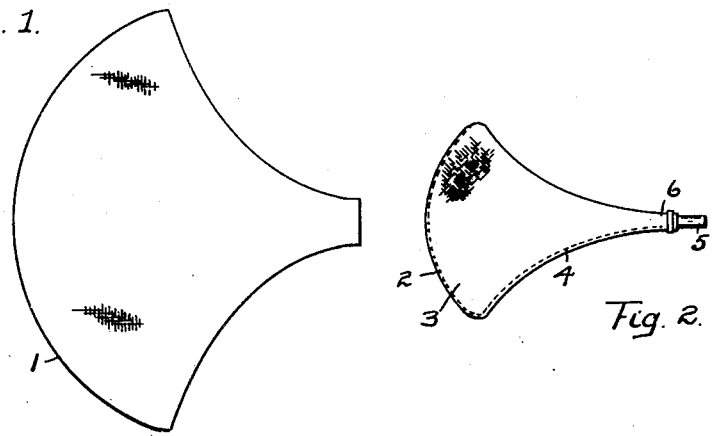
Fig. 1.
Fig. 2.
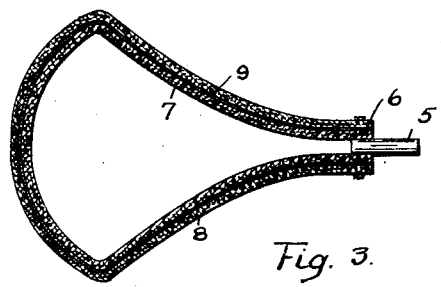
Fig. 3.
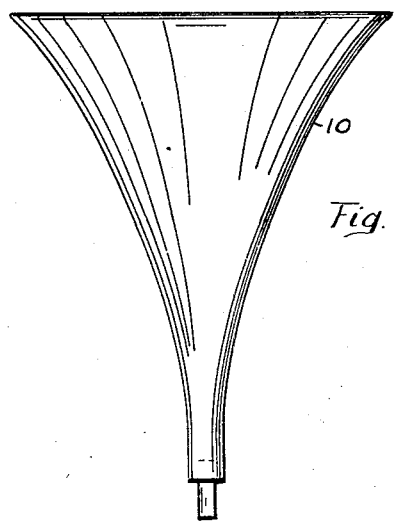
Fig. 4.
L. Sykes and
M. Zent.
INVENTORS
BY Elwin M. Hulse
ATTORNEY.

Patented Oct. 29, 1929

1,733,247

UNITED STATES PATENT OFFICE

LEONARD SYKES AND MOODY ZENT, OF FORT WAYNE, INDIANA

PROCESS OF MANUFACTURE OF HORNS

Application filed July 2, 1928. Serial No. 289,940.

The invention relates to the manufacture of horns especially for radio loud speakers.

Radio horns are largely formed of moldable materials. The mold in many cases is difficult to withdraw, especially in forming a convolute horn, so that the horn is formed in sections and the sections secured together in the finished horn.

The object of our invention is to form a horn in various shapes and in novel manner without the use of a mold.

We have found that an efficient horn may be economically made by inflating a fabric bladder of the desired shape or pattern and properly treated to harden upon inflation, the bladder being enclosed in a fabric cover or casing of the same shape or pattern as the bladder and lastly cutting off the end of the bladder and casing to form the mouth of the horn.

A simple process for accomplishing our invention consists of the following steps:

We first cut the pattern out of suitable material, such as canvas, to secure the desired shape of the horn and sew up the same to form a bladder and remove all unnecessary material from the same. A tone arm is then inserted and suitably secured in the small end or neck of the bladder. The wall of the bladder is then treated with a suitable material that will impregnate the wall and substantially close its pores and which will also harden. A solution of resin for said purpose is very satisfactory. An outer cover is cut out of suitable fabric on substantially the same pattern as the bladder, the fabric preferably having a nap on one side. The cover is sewed up similarly to the bladder and is drawn over the impregnated bladder with the nap side facing the bladder. Where the bladder is impregnated with resinous material it is necessary to subject the bladder with the cover thereon to a temperature that will soften the resinous material, as in a heater having a temperature of approximately 250° Fahrenheit. The bladder and cover are then removed from the heater and inflated until the article assumes the shape intended by the pattern, the air pressure being maintained until the wall hardens, the wall of the bladder and cover becoming a unit. The outer cover is then coated with a suitable material, such as a solution of dextrin and glue and permitted to dry. After the article is thoroughly dry an opening is cut in the outer or larger end or bell and the horn is complete and ready for use or installation.

The inflation of the bladder, of course, causes its wall to firmly engage and stretch the cover, the nap on the cover forming a desirable cushion between the two walls.

In the accompanying drawings Figure 1 is a plan view of the blank for the bladder; Fig. 2 a plan view of the bladder with the tone arm attached; Fig. 3 an exaggerated longitudinal cross section of the bladder with the cover thereon and Fig. 4 an enlarged elevational view of a complete horn.

The blank is cut in accordance with a predetermined pattern and is folded upon itself and seamed at 2 to close the bell forming end 3 and also seamed at 4 to close the longitudinal edges. The tone arm 5 is secured in a suitable manner in the reduced end 6 of the bladder 7 thus formed. After impregnating the bladder with the resinous material the cover 8 is drawn over the bladder. This cover is formed similarly to the bladder. Upon the inflation of the bladder it and the cover assume the shape shown in Fig. 4, the walls of the bladder and cover form a unitary wall with the nap 9 on the inner surface of the cover remaining soft and forming a cushion in the wall that is most desirable. The resinous material does not and should not appreciably permeate the cover in order that the nap on the cover shall remain in a soft condition.

After the cover has been treated with a solution of glue and dextrin and fully dried out the wall at the bell end is cut out and the horn 10 is formed.

Any desired shape may be given to the horn by properly cutting the blank. The blank may be formed in as many parts as may be necessary and stitched together to secure the desired shape for the horn, the straight horn illustrated being illustrative of the process only.

We intend to use any material in treating the bladder that will render it substantially impervious and will cause its wall to harden when inflated and hold its shape. Resin, although very satisfactory for this purpose is only one material having the essential quality of hardening.

What we claim is:

1. The process of manufacturing horns which consists in forming a bladder having the shape, when distended, of the intended horn, impregnating the bladder with a material adapted to harden, enclosing the bladder in a cover, inflating the bladder and impregnating the cover with a sizing solution and finally cutting an opening in the finished wall to form the bell of the horn.

2. The process of manufacturing horns which consists in forming a fabric bladder having the shape, when distended, of the intended horn, impregnating the fabric with resinous material, enclosing the bladder in a cover, inflating the bladder and cover, applying a sizing solution to the cover and finally cutting an opening in the finished wall to form the bell of the horn.

3. The process of manufacturing horns which consists in forming a fabric bladder having the shape, when distended, of the intended horn, impregnating the bladder with resinous material, enclosing the bladder in a fabric cover having a shape corresponding to the shape of the bladder and having a soft nap on its inner surface, subjecting the enclosed bladder to heat, inflating the same while hot, impregnating the cover with a solution of glue and dextrin and finally cutting an opening in the finished wall to form the bell of the horn.

4. The process of manufacturing radio horns which consists in forming a fabric bladder having the shape, when inflated, of the intended horn, attaching a tone arm to the bladder, impregnating the fabric with resinous material, enclosing the bladder in a snugly fitting fabric cover having a soft nap opposing the outer surface of the bladder, subjecting the enclosed bladder to heat, inflating the same while hot, impregnating the cover with a solution of glue and dextrin and finally cutting an opening in the finished wall to form the bell of the horn.

5. The process of manufacturing horns which consists in forming a fabric bladder having the shape when distended of the intended horn, applying to the bladder a hardening material, enclosing the bladder in a cover, inflating the same and finally cutting an opening in the hardened wall to form the bell of the horn.

In witness whereof we have hereunto set our hands.

LEONARD SYKES.
MOODY ZENT.